June 29, 1965 V. J. KORKOWSKI 3,192,512

NONDESTRUCTIVE READOUT PERMALLOY TRANSFLUXOR MEMORY SYSTEM

Filed July 2, 1962 3 Sheets-Sheet 1

INVENTOR
VINCENT J. KORKOWSKI
BY Herbert Sonnemeyer
ATTORNEY

June 29, 1965 V. J. KORKOWSKI 3,192,512

NONDESTRUCTIVE READOUT PERMALLOY TRANSFLUXOR MEMORY SYSTEM

Filed July 2, 1962 3 Sheets-Sheet 2

June 29, 1965 V. J. KORKOWSKI 3,192,512

NONDESTRUCTIVE READOUT PERMALLOY TRANSFLUXOR MEMORY SYSTEM

Filed July 2, 1962 3 Sheets-Sheet 3

United States Patent Office 3,192,512
Patented June 29, 1965

3,192,512
NONDESTRUCTIVE READOUT PERMALLOY TRANSFLUXOR MEMORY SYSTEM

Vincent J. Korkowski, Minneapolis, Minn., assignor to Sperry Rand Corporation, New York, N.Y., a corporation of Delaware Filed July 2, 1962, Ser. No. 206,864
16 Claims. (Cl. 340—174)

This invention relates generally to magnetic memory systems and more specifically to a system of nondestructive readout of information from a transfluxor type memory device.

Multi-apertured ferrite cores termed "transfluxors" and their conventional operation have been described in the article, "The Transfluxor" by Rajchman and Lo, Proceedings of the IRE, March 1956, pages 321–332. The present invention utilizes a two apertured transfluxor which may be photo-etched from a Permalloy sheet with the thickness thereof being in the range of ⅛ to 1 mil. In a preferred embodiment of this invention a plurality of transfluxors are formed along a strip, or from a sheet, of ferro-magnetic material such that the particular transfluxors are bit- or word-oriented with the ferromagnetic material acting as a conductor for a read pulse. By utilizing the transfluxor material as a read pulse conductor a separate conductor, or winding, therefore is eliminated.

A first preferred embodiment of this invention has the transfluxors formed along a continuous strip of magnetic material with the strip of transfluxors word-oriented for the readout process while write-in is accomplished by conventional coincident field techniques. The read pulse is driven down the strip of magnetic material causing simultaneous readout of all the bits of the strip. A second preferred embodiment of this invention has the transfluxors formed along a continuous strip of magnetic material with the strip of transfluxors bit-oriented for the readout process while write-in is accomplished by conventional coincident field techniques. In this second embodiment there are two parallel strips of transfluxors for each digit line with two transfluxors per bit; one storing the true and the other storing the complement. The read pulse is driven down the selected true or complement strip of magnetic material causing simultaneous readout of all the bits of the selected strip defining similar bits of the stored words.

In the prior art method of nondestructive readout of transfluxors readout is achieved by the reversal of flux about the smaller of two apertures. As the transfluxor stores its information with respect to the flux about its larger aperture this reversal of flux about its smaller aperture is considered to be nondestructive as the state of the flux about the larger aperture is not effected during readout. However, a second, or restore, pulse is necessary to restore the flux about the smaller aperture to the condition prior to application of the read pulse. This second, or restore, pulse is an unconditional and essential occurrence following every readout cycle and is not dependent upon the state of the transfluxor prior to readout.

The method of nondestructive readout of a transfluxor as utilized in the present invention requires no second, or restore, pulse after readout. This is due to the fact that readout is accomplished by a momentary rotation of the flux about the larger aperture, not a reversal of flux about the smaller aperture. Momentary rotation of the flux about the larger aperture caused by the flow of the read pulse through the transfluxor core material causes a substantial net current to be induced in the read winding threading the larger aperture if the transfluxor is in the blocked state, but causes an insubstantial net current to be induced in the read winding if the transfluxor is in the unblocked state. It is then apparent by the elimination of the second, or restore, pulse that the method of achieving nondestructive readout of a transfluxor of the present invention is appreciably faster than that of the prior art method. Additionally, due to the inherently faster speed of the simple rotation of flux as compared to the prior art reversal of flux a further substantially increased speed of readout is achieved. Therefore, it is apparent that the present invention provides a substantial improvement over the prior art method of nondestructive readout of a transfluxor type magnetic memory element.

Accordingly, it is a primary object of this invention to provide a transfluxor type of magnetic memory system which may be fabricated by any one of various methods such as vacuum deposition, etching, or electro-plating.

It is a further object of this invention to provide a transfluxor type core from which the information stored therein may be nondestructively readout by utilizing the core material as the read conductor and by passing a read pulse therethrough.

It is a further object of this invention to provide a word-organized magnetic memory system utilizing a plurality of transfluxor type cores fabricated from a continuous, integral strip, or sheet, of magnetic material discrete portions of which form separate transfluxor type cores and in which said strip is utilized as the word read pulse conductor.

It is a fruther object of this invention to provide a search memory wherein all the memory devices of each digit line are fabricated from one continuous, integral strip of magnetic material.

It is a further object of this invention to provide a search memory in which the information stored therein is stored in both the true and complement form and in which the information stored therein may be nondestructively readout by passing the read pulse down the bit-organized strip of transfluxor type cores which cores are formed at discrete, integral portions of a continuous strip of magnetic material.

It is a further object of this invention to provide a word-organized magnetic memory system wherein all the memory devices of each word line are fabricated from one continuous, integral strip of magnetic material.

It is a further object of this invention to provide a word-organized magnetic memory system of which the information stored therein may be nondestructively readout by passing the read pulse down the word-organized strip of transfluxor type cores which cores are formed at discrete, integral portions of a continuous strip of magnetic material.

It is a still further object of this invention to provide a method whereby a transfluxor type core may be nondestructively readout by passing the read pulse through the core material rather than coupling the read pulse to the transfluxor type core by a winding coupling one or more of the apertures thereof.

These and other more detailed and specific objects will be disclosed in the course of the following specification, reference being had to the accompanying drawings in which:

FIG. 1*a* illustrates the transfluxor magnetic flux paths indicative of a blocked state with a typical output signal generated in the output winding by the passage of a read pulse through the core material.

FIG. 1*b* illustrates the transfluxor magnetic flux paths indicative of an unblocked state with a typical output signal generated in the output winding by the passage of a read pulse through the core material.

FIG. 2 illustrates a preferred embodiment of the transfluxor type core disclosed by this specification in a two word, three bit word, word-organized magnetic memory system.

FIG. 3*a* is a trimetric sectional view of core 10 and is taken along winding 12 as shown in FIG. 1*a*.

FIG. 3*b* is an enlarged view of section 14 of FIG. 3*a*.

FIG. 4a is a trimetric sectional view of core 10 and is taken along winding 12 as shown in FIG. 1b.

FIG. 4b is an enlarged view of section 14 of FIG. 4a.

Figures 1A, 1B:
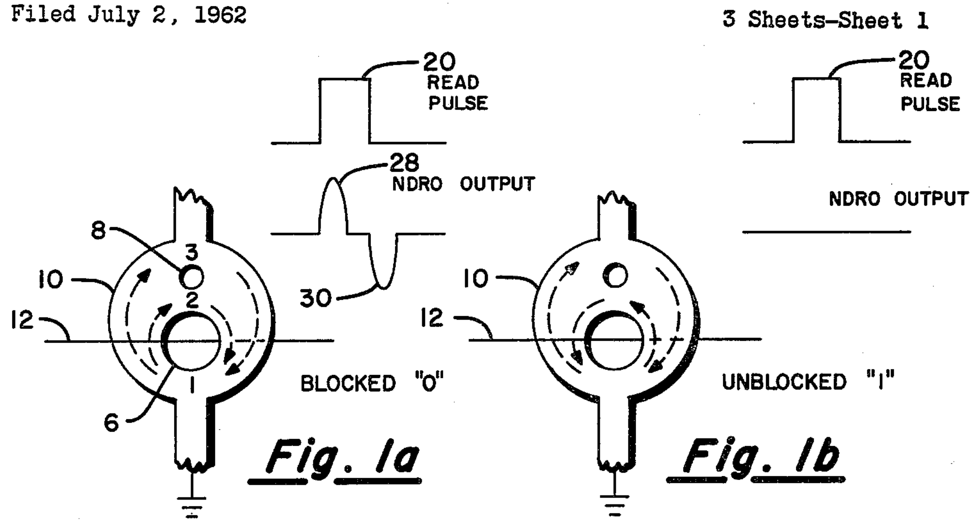

The method and theory of operation of a conventional transfluxor are described and discussed in detail in the aforementioned article of Rajchman and Lo and, consequently, only a brief review will be given here. A transfluxor comprises a core 10 of magnetic material with a substantially rectangular hysteresis characteristic having two or more apertures therethrough. A typical configuration is that of a circular form with two circular apertures of unequal diameters which form three distinct legs 1, 2, and 3, in the magnetic circuit as illustrated in FIG. 1a. The areas of the cross sections of the legs 2 and 3 are equal and the cross section of leg 1 is equal to, or greater than, the sum of those of legs 2 and 3. The peripheries of the two apertures define two magnetic flux paths the reluctances of the first flux path around the first and substantially larger diameter aperture 6 is substantially greater than the reluctance of the second flux path around the periphery of the substantially smaller diameter aperture 8.

The differing reluctances of the two flux paths may be effected by means other mere flux path lengths. Such means may include different heat treatment of the two flux paths, introducing metals having a differing magnetic characteristic into a particular flux path, or providing a magnetic bias field in one flux path. Consequently, the limitation of physical size of the flux paths, apertures, or the legs is not intended to be a limitation upon the invention disclosed herein.

As illustrated in FIGS. 1a and 1b, the two magnetic states identified as the "blocked" and "unblocked" states may be defined by the direction of flux orientation through legs 2 and 3. It is seen that the transfluxor is blocked when the directions of remanent inductions of the legs surrounding the smaller aperture, legs 2 and 3, are the same and unblocked when they are opposite. It is a characteristic of a transfluxor that the information as to whether the transfluxor is blocked or unblocked can be thought of as being stored in terms of flux through leg 1. In a blocked state the flux in leg 1 is in a clockwise or counterclockwise direction and is of a substantial magnitude while in an unblocked state the net flux in leg 1 is of an insubstantial magnitude. As this invention is only concerned with the reading of information from a transfluxor, the writing operation, or the method of achieving the blocked or unblocked states, shall not be discussed in detail. Any conventional transfluxor writing method such as discussed in the aforementioned Rajchman and Lo article may be utilized to write information into the selected transfluxor.

As stated previously, the novelty of the invention disclosed in this specification includes a novel method of fabrication of transfluxors from a single sheet, or strip, of magnetic material having a substantially rectangular hysteresis characteristic and the method of achieving the nondestructive readout (NDRO) of a transfluxor by applying a transverse field to the transfluxor by passing a read pulse through the material of the transfluxor itself rather than coupling the read pulse to the transfluxor by a winding threading an aperture therein.

Transfluxors utilized in the illustrated embodiment of this invention may be fabricated from any one of many well known methods such as vacuum deposition in accordance with S. M. Rubens, Patent No. 2,900,282, electrodeposition, or photo-etched from a Permalloy sheet. Preferred thicknesses of the transfluxor would be in the range of one-eighth to 1 mil with the total thickness of the transfluxor including substrate being in the range of 5 mils. With the above mentioned methods of fabrication it is possible to obtain accurate geometries thus making possible uniform output signals.

Figures 4A, 4B:
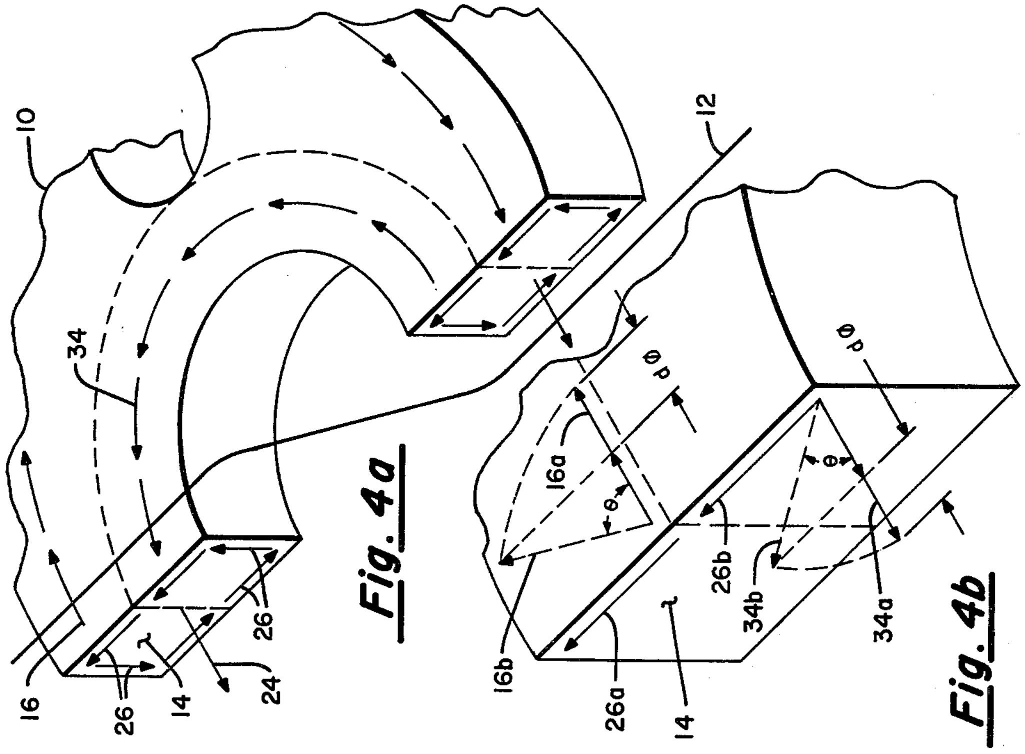
Figures 3A, 3B:
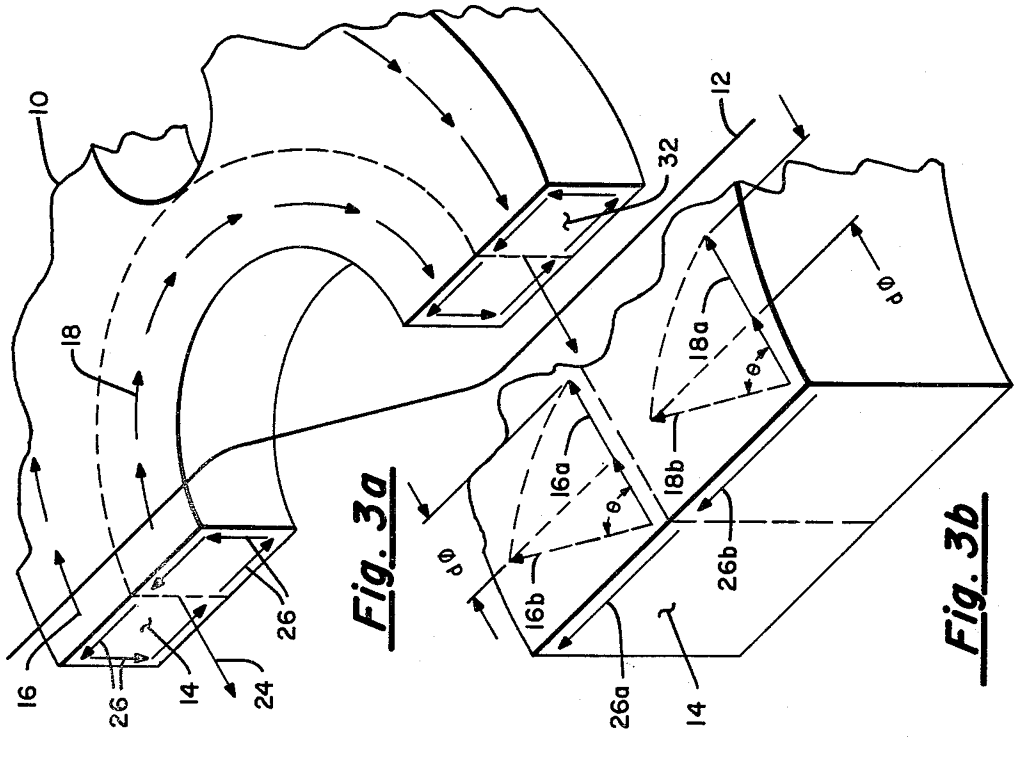

Operation of transfluxor core 10 as a nondestructive readout magnetic memory device shall be explained by use of FIGS. 3a and 3b for the blocked condition for which the readout signal is a bipolar pulse as shown in FIG. 1a and by use of FIGS. 4a and 4b for the unblocked condition for which the readout signal is insignificant as shown in FIG. 1b.

FIG. 3a is a trimetric sectional view of core 10 and is taken along winding 12 as shown in FIG. 1a, and illustrates the flux paths and flux conditions along such sections which contain the flux linking winding 12.

FIG. 3b is an enlarged view of section 14 of FIG. 3a and depicts a schematic vector illustration of the temporary reduction of the flux of flux paths 16 and 18. With a read pulse 20 driven through core 10 by read pulse generator 22 a quadrature field current represented by vector 24 flows through section 14. This quadrature field current generates a counterclockwise associated magnetic field illustrated by the vectors 26. Quadrature field current vector rotates flux 16 from initial position 16a through an angle $\theta$ to new position 16b effecting a decrease in flux 16 as expressed by the formula:

$$d\phi = AB(1-\cos\theta)$$

In like manner quadrature field current vector 26b rotates flux 18 from initial position 18a through an angle $\theta$ to new position 18b resulting in a decrease in flux 18 as expressed by the formula:

$$d\phi = AB(1-\cos\theta)$$

where:

$d\phi$=change in flux in the direction of the flux path;
$B$=average flux density through the section of the flux path;
$A$=area of the cross section of the flux path;
$\theta$=the angle through which the flux is rotated.

In the blocked state, or stored "0," as illustrated in FIGS. 3a and 3b, it can be seen that the reductions of flux in flux paths 16 and 18 are of the same magnitude and the same direction. It will be appreciated that winding 12, which threads the larger aperture 6 and lays over the top surface of core 10 in the area of section 14 and lays under the bottom surface of core 10 in the area of section 32, is effected by similar flux variations in the area of section 32 as in the area of section 14. These two effects are additive producing pulse 28 when fluxes 16 and 18 in the area of sections 14 and 32, are momentarily decreased in magnitude due to the application of the quadrature field current pulse 20, while pulse 30 is produced upon the release of the quadrature field current pulse 20 as illustrated in FIG. 1a.

FIG. 4a is a trimetric sectional view of core 10 and is taken along winding 12 as shown in FIG. 1b, and illustrates the flux paths and flux conditions along such sections which contain the flux linking winding 12.

FIG. 4b is an enlarged view of section 14 of FIG. 4a and depicts the schematic vector illustration of the temporary reduction of the flux of flux paths 16 and 34. With a read pulse 20 driven through core 10 by read pulse generator 22 a quadrature field current represented by vector 24 flows through section 14. This quadrature field current generates a counterclockwise associated magnetic field illustrated by the vectors 26. Quadrature field current vector 26a rotates flux 16 from initial position 16a through an angle $\theta$ to new position 16b effecting a decrease in flux 16 as expressed by the formula:

$$d\phi = AB(1-\cos\theta)$$

In like manner quadrature field current vector 26b rotates flux 34 from the initial position 34a through an angle $\theta$, to a new position 34b resulting in a decrease in flux 34 as expressed by the formula:

$$d\phi = AB(1-\cos\theta)$$

In the unblocked state or stored "1," as illustrated in FIGS. 4*a* and 4*b*, it can be seen than the reductions of flux in flux paths 16 and 34 are of the same magnitude but of the opposite polarity. It will be appreciated that winding 12, which threads the larger aperture 6 and lays over the top surface of core 10 in the area of section 14 and lays under the bottom surface of core 10 in the area of section 32, is effected by similar flux variations in the area of section 32 as in the area of section 14. These two effects, i.e., that of vector 26*a* on flux 16 and 26*b* on flux 34, are subtractive producing an insubstantial output on output winding 12 as illustrated in FIG. 1*b*.

Figure 2:
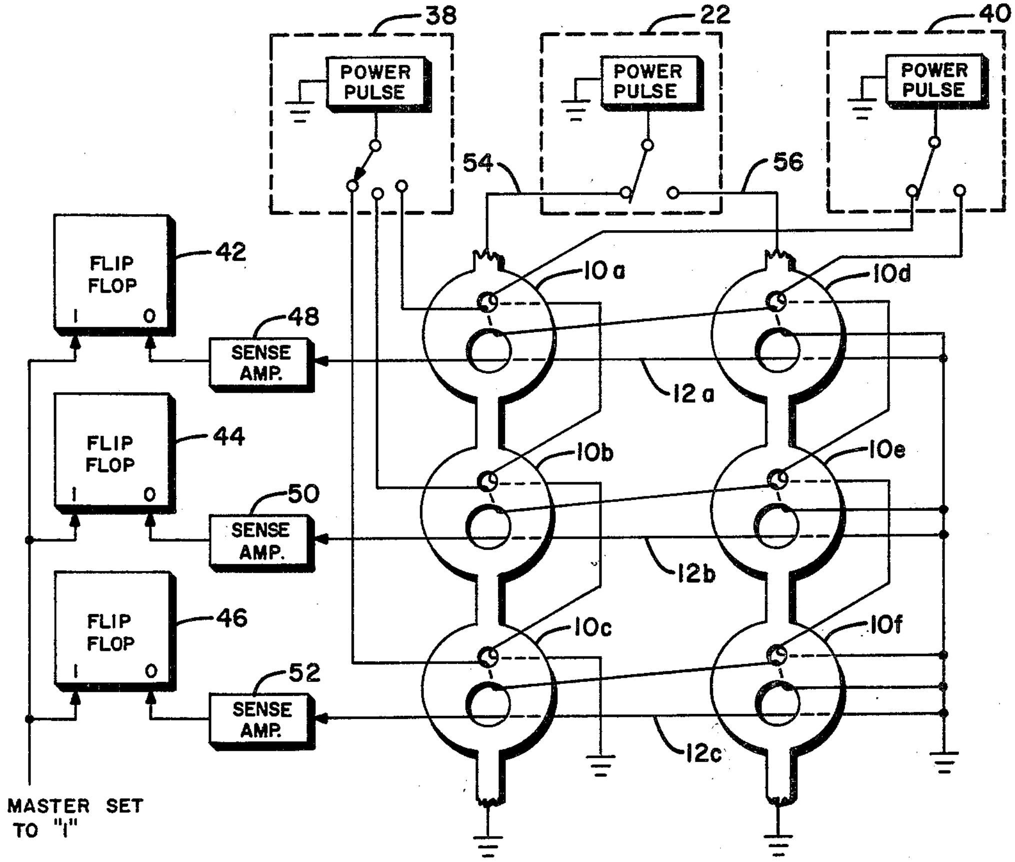

The operation of a plurality of cores 10*a*–10*f* arranged in a word-organized magnetic memory system of two words of three bits per word and as illustrated in FIG. 2 shall now be explained. Each word line, or column of FIG. 2, consists of a plurality of cores 10 fabricated from a single sheet, or strip, of magnetic material as explained hereinbefore. A separate readout winding 12 threads through the larger apertures 6 of each core 10 forming rows, which rows are associated with separate bits of the separate words defined by the separate columns of cores 10. Pulse sources 38 and 40 and their associated windings provide the necessary drive current pulses to write information into cores 10 as explained in the aforementioned Rajchman and Lo article. Flip-flops 42, 44, and 46 may be stages of an output register storing the readout information. Sense amplifiers 48, 50, and 52 provide the necessary amplification of the output signals to drive the associated flip-flops 42, 44, and 46, respectively. Read pulse generator 22 includes switching means which may be utilized to apply the read pulse to either word line 54 or word line 56. In the system of nondestructive readout utilized herein it is recognized by one skilled in the art that the conventional blocked "0" and unblocked "1" states result in a significant output from a blocked "0" and an insignificant output from an unblocked "1" which is opposite to conventional storage techniques. To make the memory system compatible with conventional digital usage flip-flops 42, 44, and 46 may be master set to contain all "1's" so that sense amplifiers 48, 50, and 52 upon readout of a significant signal indicating a stored "0" will clear the associated flip-flop to a "0."

Assuming that cores 10*a*, 10*b*, and 10*c* of word line 54 have been placed into blocked, unblocked, and blocked states, respectively, by pulse source 38 and pulse source 40, by methods well known in the art, parallel nondestructive readout of the word stored in word line 54, i.e., "010," is straightforward. Read pulse generator 22, which is coupled to word line 54, drives a single read pulse 20 therethrough. Read pulse 20 is conducted through the integral termianl portions of cores 10*a*, 10*b*, and 10*c* of word line 54 effecting a temporary reduction of the magnetic fluxes traversing the high reluctance flux paths defined by the peripheries of their larger apertures 6. Readout windings 12*a*, 12*b*, and 12*c*, which are coupled to the larger apertures 6 of cores 10*a*, 10*b*, and 10*c*, respectively, are coupled to the altering magnetic fields created by the variation of the flux traversing flux paths 16 and 18 and in turn couple the induced voltages to sense amplifiers 48, 50, and 52 which drive their associated flip-flops 42, 44, and 46, respectively.

As explained above, a core 10 when in a blocked state and when traversed by a read pulse 20 effects a substantial bipolar readout pulse in the associated readout winding as illustrated in FIG. 1*a* while when in an unblocked state and traversed by a read pulse 20 effects a negligible output signal as illustrated in FIG. 1*b*. Consequently, when read pulse 20 flows through word line 54 and through cores 10*a*, 10*b*, and 10*c*, a substantial readout signal is induced in windings 12*a* and 12*c* indicative of a stored "0" and an insubstantial readout signal is induced in winding 12*b* indicative of a stored "1." Flip-flops 42, 44, and 46 which represent stages of a buffer register or temporary storage device have been master set prior to the read cycle to contain all "1's." When driven by the associated sense amplifier outputs sense amplifiers 48 and 52 provide a clearing pulse to flip-flops 42 and 46, respectively, which clear flip-flops 42 and 46, respectively, to a "0." Consequently, after readout, flip-flops 42, 44, and 46 contain the word "010" which is a representation of the information stored in cores 10*a*, 10*b*, and 10*c*, respectively.

Figure 5:
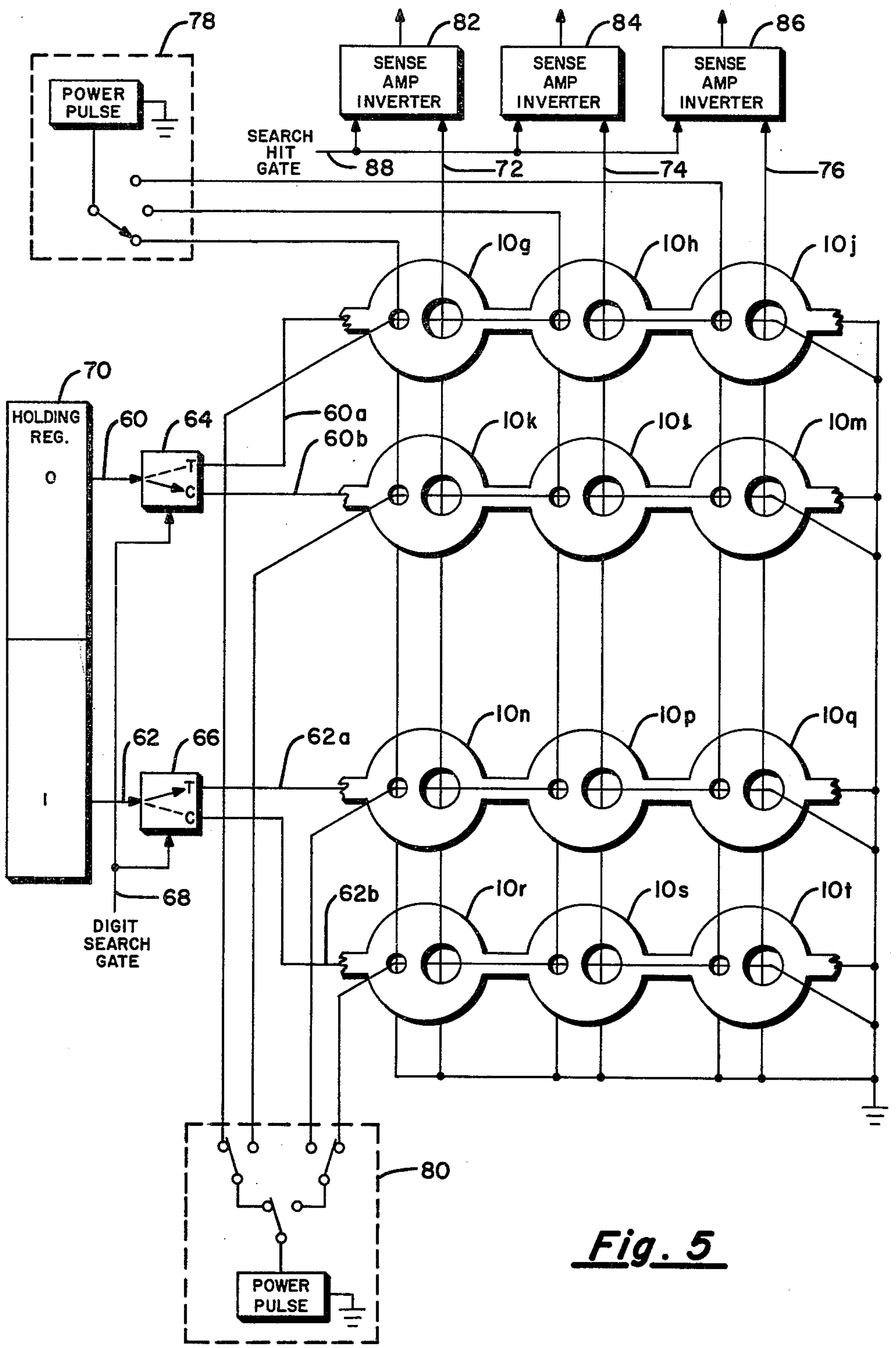
FIG. 5 illustrates a preferred embodiment of the transfluxor type core disclosed by this specification in a three word, two bit word, bit-organized search memory.

The operation of a plurality of cores 10*g*–10*t* in a bit-organized search memory system of three words of two bits per word and two cores per bit as illustrated in FIG. 5 shall now be explained. Each digit line, or row, of FIG. 5 consists of two strips of a plurality of cores 10 fabricated from a single sheet, or strip, of magnetic material as explained hereinbefore. Each digit line such as digit lines 60 and 62, drives its associated digit search driver 64 and 66, respectively, which upon initiation of digit search gate 68 drive a read pulse down the selected true digit lines 60*a* and 62*a* or complement digit line 60*b* and 62*b*. Holding register 70 provides temporary storage for the word searched for with digit lines 60 and 62 coupling its bit positions, or stages, to digit search driver 64 and 66, respectively.

Each row of FIG. 5 consists of two digit lines, designated the true and the complement; the true line holds the true of the digit stored in that bit while the complement line holds the complement of the digit stored in that bit. Thus, each bit of two cores holds the true and the complement of the digit of the word held in the word line. Word lines 72, 74, and 76 thread the larger apertures of both the true and the complement digit line cores thereby defining the word line, or column. Pulse sources 78 and 80 and their associated windings provide the necessary drive current pulses to write information into cores 10*g*–10*t* as explained in the aforementioned Rajchman and Lo article.

The purpose of a search memory system is to compare an externally held word for equality to an internally stored word and to provide the memory location of the internally stored word for which a "hit," or equality, was found. Consequently, in the operation of the search memory of FIG. 5 the external searched for word and the internal stored words are compared bit for bit, with a hit designated by a negligible, or insubstantial, output signal on the word line of which the hit was scored. Sense amplifier inverters 82, 84, and 86 are associated with word lines 72, 74, and 76, respectively, and provide a significant signal level output only when a negligible signal is impressed upon their associated word lines 72, 74, or 76, and when gated by search hit gate 88. As explained with regard to the operation of the embodiment of FIG. 2 core 10 when in a blocked state is considered as storing a "0" and produces a significant output signal upon readout while when in an unblocked state is considered as storing a "1" and produces a negligible signal upon readout. When a digit is held in a particular bit position, or stage, of holding register 70 the stage transmits an appropriate signal to its associated digit search driver via its digit line which initiates a signal upon one of the two lines associated with the true and the complement digit lines. As a zero output signal from the readout core indicative of a hit is sought, selection by the associated digit search driver of the true digit line is made when a "1" is sought while selection of the complement digit line is made when a "0" is sought. Thus, if the particular stage of holding register 70 holds a "1" it causes a read pulse to be driven through the true digit line. If the associated core is in a blocked state indicative of storing a "0" the core induces a significant readout signal in the word line threading its larger aperture. This signal causes the associated sense amplifier-inverter to transmit a zero signal indicative of a mismatch, or no hit. If the associated core is in an unblocked state indicative of storing a "1" the core induces an insignificant readout signal in the word line threading its larger aperture. This insignificant signal causes the associated sense amplifier-inverter to transmit a significant signal indicative of a hit.

With holding register 70 holding the word "01" a search through the search memory of FIG. 5 storing the words "10," "00," and "01" in word lines 72, 74, and 76, respectively, is as follows: Holding register 70 transmits appropriate signals to digit search drivers 64 and 66 by way of digit lines 60 and 62, respectively. Digit search driver 64 looking for a "0" is switched, to complement digit line 60*b* while digit search driver 66 looking for a "1" is switched to true digit line 62*a*. Digit search gate 68 gates the read pulse from digit search drivers 64 and 66 driving the read pulses down complement digit line 60*b* and true digit line 62*a*. Cores 10*k* and 10*n* being in a blocked state indicative of a stored "0" induce a significant readout signal in word line 72 which couples the significant outputs of cores 10*k* and 10*n* to sense amplifier 82. Core 10*l* being in an unblocked state indicative of a stored "1" induces an insignificant readout signal in word line 74 while core 10*p* being in a blocked state indicative of a stored "0" induces a significant readout signal in word line 74 which couples the significant output of core 10*p* to sense amplifier-inverter 84. Cores 10*m* and 10*q* being in an unblocked state indicative of a stored "1" induce an insignificant signal in word line 76 which couples the induced insignificant signals to sense amplifier-inverter 86. Thus, sense amplifier-inverter 86 is the only sense amplifier-inverter which has an insignificant readout signal coupled thereto. Initiation of search hit gate 88 enables sense amplifier-inverter 86 to transmit a signal therefrom indicating that a hit has been scored on word line 76. Thus, it is apparent that the embodiment of FIG. 5 permits a one pulse time, nondestructive readout search of a search memory system.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. A nondestructive readout magnetic memory system comprising: a transfluxor type magnetic core having first and second terminal portions; a first aperture; a second aperture effectively smaller than said first aperture; means causing a read current pulse to flow through said core from said first terminal portion to said second terminal portion; and means (including a winding threading said first aperture) for reading information out of said core.

2. A nondestructive readout magnetic memory system comprising: a transfluxor type magnetic core having first and second terminal portions; a first aperture; a second aperture effectively smaller than said first aperture; means causing a single unipolar read current pulse to flow through said core from said first terminal portion to said second terminal portion; and means (including a winding threading said first aperture) for reading information out of said core when the flux about said first aperture is temporarily altered by the passage of said read pulse.

3. A NDRO magnetic memory system comprising: a transfluxor type magnetic core having first and second terminal portions; a first aperture, and a second aperture effectively smaller than said first aperture; a magnetic field generated by a read current pulse flowing through said core from said first terminal portion to said second terminal portion; and means (including a winding threading said first aperture) for reading information out of said core when said magnetic field effects a temporary alteration of the flux about said first aperture.

4. A NDRO magnetic memory system comprising: a transfluxor type magnetic core having first and second terminal portions; first and second magnetic flux paths defined by the peripheries of first and second apertures therethrough wherein the effective reluctance of said first path is substantially greater than that of said second path; means causing a read current pulse to flow through said core from said first terminal portion to said second terminal portion; and means coupling the high reluctance path for reading information out of said core.

5. A NDRO magnetic memory system comprising: a transfluxor type magnetic core having first and second terminal portions; first and second magnetic flux paths defined by the peripheries of first and second apertures therethrough wherein the effective reluctance of said first path is substantially greater than that of said second path; means causing a single unipolar read current pulse to flow through said core from said first terminal portion to said second terminal portion; and means coupling the high reluctance path for reading information out of said core when the flux of said high reluctance path is temporarily altered by the passage of said read pulse from said first to said second terminal portions.

6. A NDRO magnetic memory system comprising: a transfluxor type magnettic core having first and second terminal portions; first and second magnetic flux paths defined by the peripheries of first and second apertures therethrough wherein the effective reluctance of said first path is substantially greater than that of said second path; a magnetic field generated by a read current pulse flowing through said core from said first terminal portion to said second terminal portion; and means coupling the high reluctance path for reading information out of said core when the flux about said high reluctance path is temporarily altered by said field.

7. A NDRO magnetic memory system comprising: a transfluxor type magnetic core having first and second terminal portions; a first aperture; a second aperture effectively smaller than the first aperture whereby the core portion between said first aperture and the adjacent outer edge of the core forms a first leg, that portion between the apertures forms a second leg, and that portion between the second aperture and the adjacent outer edge of the core forms a third leg, said core being in a blocked state when with respect to said second aperture inductions of said second and third legs are in the same direction and in the unblocked state when they are in opposite directions; means causing a read current pulse to flow through said core from said first terminal portion to said second terminal portion thereby generating a magnetic flux in said core and effecting a temporary reduction of the net flux about said first aperture; and information reading means including a winding means linking said first aperture for reading information out of said core when the net flux of said first leg is temporarily altered by said read pulse flux.

8. A NDRO magnetic memory system comprising: a transfluxor type magnetic core having first and second terminal portions; a first aperture; a second aperture effectively smaller than said first aperture; said first and second apertures arranged serially between said first and second terminal portions and symmetrically about said cores' axis of symmetry; means causing a read current pulse to flow through said core from said first terminal portion to said second terminal potrion; and winding means threading said first aperture for reading information out of said core.

9. A NDRO magnetic memory system comprising: a transfluxor type magnetic core having first and second terminal portions; a first aperture; a second aperture effectively smaller than said first aperture; said first and second apertures oriented between said first and second terminal portions; a magnetic flux generated in said core by a read current pulse flowing through said core from said first terminal portion to said second terminal portion; and winding means threading said first aperture for reading information out of said core when the flux about said first aperture is temporarily altered by said read pulse flux.

10. A NDRO magnetic memory system comprising: a plurality of transfluxor type magnetic cores each having first and second terminal portions and first and second magnetic flux paths defined by the peripheries of first and second apertures therethrough, wherein the effective reluctances of said first path is substantially greater than that of said second path; a plurality of columns of equal numbers of said cores each column formed by the intercoupling of the said first and second terminal portions of adjacent cores; a plurality of rows of said cores formed by a parallel-arranged plurality of said columns; information detecting means intercoupling the first paths of all of the cores of each row; read current pulse generating means coupled to the first terminal portion of the first core of each column for selectively causing a read current pulse to flow through said intercoupled cores; and means coupling the second terminal portion of the last core of each column to a source of reference potential.

11. A NDRO magnetic memory system comprising: a plurality of transfluxor type magnetic cores each having first and second terminal portions and first and second magnetic flux paths defined by the peripheries of first and second apertures therethrough, wherein the effective reluctance of said first path is substantially greater than that of said second path; a plurality of double rows of equal numbers of said cores each row formed by the intercoupling of the said first and second terminal portions of adjacent cores; a plurality of columns of said cores formed by a parallel-arranged plurality of said cores of said double rows; separate information detecting means intercoupling the first paths of all of the cores of each column; read current pulse generating means coupled to the first terminal portion of the first core of each row for selectively causing a read current pulse to flow through only one row of each of said double rows; and means coupling the second terminal portion of the last core of each row to a source of reference potential.

12. A NDRO magnetic memory system comprising: a plurality of transfluxor type magnetic cores each having first and second terminal portions and first and second magnetic flux paths defined by the peripheries of first and second apertures therethrough, wherein the effective reluctance of said first path is substantially greater than that of said second path; a plurality of columns of equal numbers of said cores each column formed by the intercoupling of the said first and second terminal portions of adjacent cores; a plurality of rows of said cores formed by a parallel-arranged plurality of said columns; information detecting means intercoupling the first flux paths of all of the cores of each row; read current pulse generating means coupled to the first terminal portion of the first core of each column for selectively causing a read current pulse to flow through said intercoupled cores; means coupling the second terminal portion of the last core of each column to a source of reference potential; and separate information detecting means threading the first apertures of all the cores of each row.

13. A NDRO magnetic memory system comprising: a plurality of transfluxor type magnetic cores each having first and second terminal portions and first and second magnetic flux paths defined by the peripheries of first and second apertures therethrough, wherein the effective reluctances of said first path is substantially greater than that of said second path; a plurality of columns of equal numbers of said cores each column formed by the intercoupling of the said first and second terminal portions of adjacent cores; a plurality of rows of said cores formed by a parallel-arranged plurality of said columns; information detecting means intercoupling the first flux paths of all of the cores of each row; a magnetic flux generated in the cores of each column by a read current pulse coupled to the first terminal portion of the first core of each column; and means coupling the second terminal portion of the last core of each column to a source of reference potential; said read current pulse flowing through the body of all of the cores of the associated column and causing a temporary alteration of the flux of said first path.

14. A NDRO magnetic memory system comprising: a plurality of transfluxor type magnetic cores each having first and second terminal portions and first and second magnetic flux paths defined by the peripheries of first and second apertures therethrough, wherein the effective reluctance of said first path is substantially greater than that of said second path; a plurality of rows of equal numbers of said cores each row formed by the intercoupling of the said first and second terminal portions of adjacent cores; a plurality of columns of said cores formed by a parallel-arranged plurality of said cores of said rows; information detecting means intercoupling the first flux paths of all of the cores of each column; read current pulse generating means coupled to the first terminal portion of the first core of each row for selectively causing a read current pulse to flow through at least one of said rows; and means coupling the second terminal portion of the last core of each row to a source of reference potential.

15. A NDRO magnetic memory system comprising: a plurality of transfluxor type magnetic cores each having first and second terminal portions and first and second magnetic flux paths defined by the peripheries of first and second apertures therethrough, wherein the effective reluctances of said first path is substantially greater than that of said second path; a plurality of double rows of equal numbers of said cores each row formed by the intercoupling of the said first and second terminal portions of adjacent cores; a plurality of columns of said cores formed by a parallel-arranged plurality of said cores of said double rows; information detecting means intercoupling the first flux paths of all of the cores of each column; read current pulse generating means coupled to the first terminal portion of the first core of each row for selectively causing a read current pulse to flow through only one row of each of said double rows; and means coupling the second terminal portion of the last core of each row to a source of reference potential.

16. A NDRO magnetic memory system comprising: a plurality of transfluxor type magnetic cores each having first and second terminal portions and first and second apertures therethrough, wherein the core portion between said first aperture and the adjacent outer edge of the core forms a first leg, that portion between the apertures forms a second leg, and that portion between the second aperture and the outer edge of the core forms a third leg; the width of legs 2 and 3 being equal and the sum of their widths being equal to or less than that of the width of said first leg; a plurality of double rows of equal numbers of said cores each row formed by the intercoupling of the said first and second terminal portions of adjacent cores; a plurality of columns of said cores formed by a parallel-arranged plurality of said cores of said rows; information detecting means intercoupling the first legs of all of the cores of each column; read current pulse generating means coupled to the first terminal portion of the first core of each row for selectively causing a read current pulse to flow through only one row of each of said double rows; and means coupling the second terminal portion of the last core of each row to a source of reference potential.

References Cited by the Examiner

UNITED STATES PATENTS

| | | | |
|---|---|---|---|
| 2,803,812 | 8/57 | Rajchman et al. | 340—174 |
| 2,911,628 | 11/59 | Briggs | 340—174 |
| 2,991,455 | 7/61 | Brown | 340—174 |
| 3,078,445 | 2/63 | Sass | 340—173.1 |

IRVING L. SRAGOW, *Primary Examiner.*